(12) United States Patent
Pejhan

(10) Patent No.: US 12,542,938 B2
(45) Date of Patent: Feb. 3, 2026

(54) METHOD FOR DYNAMIC CONFIGURATION OF MULTIMEDIA CONTENT ENCODER AND APPARATUS FOR IMPLEMENTING THE SAME

(71) Applicant: ATEME, Velizy Villacoublay (FR)

(72) Inventor: Sassan Pejhan, Princeton, NJ (US)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 18/224,742

(22) Filed: Jul. 21, 2023

(65) Prior Publication Data

US 2024/0031629 A1    Jan. 25, 2024

(30) Foreign Application Priority Data

Jul. 21, 2022 (EP) .................................... 22306084

(51) Int. Cl.
| | |
|---|---|
| *H04N 21/2365* | (2011.01) |
| *H04N 21/2343* | (2011.01) |
| *H04N 21/24* | (2011.01) |
| *H04N 21/258* | (2011.01) |
| *H04N 21/2662* | (2011.01) |
| *H04N 21/6379* | (2011.01) |

(52) U.S. Cl.
CPC ......... *H04N 21/24* (2013.01); *H04N 21/2343* (2013.01); *H04N 21/23439* (2013.01); *H04N 21/23655* (2013.01); *H04N 21/25866* (2013.01); *H04N 21/2662* (2013.01); *H04N 21/6379* (2013.01)

(58) Field of Classification Search
CPC ......... H04N 21/23655; H04N 21/6379; H04N 21/24; H04N 21/2343; H04N 21/25866; H04N 21/23439; H04N 21/2662
See application file for complete search history.

(56) References Cited

U.S. PATENT DOCUMENTS

| | | | |
|---|---|---|---|
| 9,253,229 B1* | 2/2016 | Strothmann | H04N 21/23439 |
| 10,652,625 B1* | 5/2020 | Saxton | H04N 21/8547 |
| 10,958,947 B1* | 3/2021 | Wei | H04N 21/236 |
| 11,076,187 B2* | 7/2021 | Kalagi | H04N 21/2662 |

(Continued)

OTHER PUBLICATIONS

Search Report issued in related application EP 22306084.9, Jan. 13, 2023, 3 pages.

*Primary Examiner* — Pinkal R Chokshi
(74) *Attorney, Agent, or Firm* — Faegre Drinker Biddle & Reath LLP

(57) ABSTRACT

A method for managing the encoding of a multimedia content stream distributed in dynamic mode to viewing devices according to a set of profiles comprising a plurality of multimedia data distribution profiles usable by the viewing devices for reception of the multimedia content stream is proposed. Usage statistics data for at least one of the multimedia data distribution profiles is obtained, the usage statistics data representing usage, by the viewing devices, of the multimedia data distribution profile for receiving the multimedia content stream. Based on the usage statistics data, the set of profiles are updated by excluding the multimedia data distribution profile from the set of profiles. Based on the updated set of profiles, a configuration of an encoder used for encoding the multimedia content stream distributed to the viewing device is determined. The encoding is updated according to the determined encoder configuration.

19 Claims, 7 Drawing Sheets

(56) References Cited

U.S. PATENT DOCUMENTS

| | | | |
|---|---|---|---|
| 2006/0018254 A1* | 1/2006 | Sanders | H04N 21/23655 370/216 |
| 2012/0005716 A1* | 1/2012 | Milne | H04N 19/46 375/E7.126 |
| 2013/0058393 A1* | 3/2013 | Soroushian | H04N 19/146 375/E7.026 |
| 2013/0286868 A1 | 10/2013 | Yadav et al. | |
| 2015/0089557 A1* | 3/2015 | Busse | H04N 21/8456 725/95 |
| 2015/0201042 A1 | 7/2015 | Shah et al. | |
| 2016/0044080 A1 | 2/2016 | DuBreuil | |
| 2018/0184146 A1* | 6/2018 | Pichon | H04N 21/2407 |
| 2019/0281337 A1 | 9/2019 | Guionnet | |
| 2020/0152234 A1* | 5/2020 | Sharma | H04N 21/23439 |
| 2022/0141513 A1 | 5/2022 | Dai et al. | |

\* cited by examiner

| Profile # | Resolution (pixels) | Average bitrate (bps) |
|---|---|---|
| 1 | 3840x2160 | 16800 |
| 2 | 3840x2160 | 11600 |
| 3 | 2560x1440 | 8100 |
| 4 | 1920x1080 | 5800 |
| 5 | 1920x1080 | 4500 |
| 6 | 1280x1080 | 3400 |
| 7 | 1280x1080 | 2400 |
| 8 | 960x540 | 1600 |
| 9 | 960x540 | 900 |
| 10 | 960x540 | 600 |
| 11 | 768x432 | 300 |
| 12 | 640x360 | 145 |

FIG. 1a

| Profile # | Resolution (pixels) | Average bitrate (bps) | Usage statistics |
|---|---|---|---|
| 1 | 3840x2160 | 16800 | 2% |
| 2 | 3840x2160 | 11600 | 22% |
| 3 | 2560x1440 | 8100 | 1% |
| 4 | 1920x1080 | 5800 | 30% |
| 5 | 1920x1080 | 4500 | 0% |
| 6 | 1280x1080 | 3400 | 2% |
| 7 | 1280x1080 | 2400 | 18% |
| 8 | 960x540 | 1600 | 0% |
| 9 | 960x540 | 900 | 23% |
| 10 | 960x540 | 600 | 0% |
| 11 | 768x432 | 300 | 1% |
| 12 | 640x360 | 145 | 1% |

FIG. 1b

1. Start with MaxVarNo ABR ladder
2. Wait T1 (e.g. 15) minutes to reach steady-state
3. Collect statistics on usage of each profile (% of viewers per profile) over a T2-minute window (e.g. 5 minutes)
4. For each profile {
   A. if (usage of profile is less than 2%) {
      i. If profile is the only profile at highest resolution do nothing;
      ii. Else-If profile is lowest bitrate in original ladder do nothing;
      iii. Else-If number of Profiles == MinVarNo do nothing;
      iv. Else
         a. Delete profile from the New/updated Manifest file
         b. Decrement CurrentVarNo by 1.
         c. UpdateManifest == TRUE
   B. } else do nothing;
5. If (UpdateManifest == TRUE)
   A. send updated manifest file
   B. Wait 30 seconds (to process in transit requests)
   C. Reconfigure encoder with new ABR ladder (that corresponds to the updated manifest file)
   D. UpdateManifest = FALSE
6. Collect statistics on number of downshifts and upshifts over a 5-minute window, as well as statistics on usage of each profile in the new ladder
7. If average no. of up/downshifts per user exceeds a certain threshold SHIFTpU (e.g. once per minute)
   A. If CurrentVarNo < MaxVarNo
      i. add the lowest bitrate profile from among those that have been deleted from the original ABR ladder to the encoder output
8. Goto step 4

FIG. 4a

METHOD FOR DYNAMIC CONFIGURATION OF MULTIMEDIA CONTENT ENCODER AND APPARATUS FOR IMPLEMENTING THE SAME

CROSS-REFERENCE TO RELATED APPLICATIONS

This application claims priority benefit under 35 U.S.C. § 119(d) from European Patent Application No. 22 306 084.9, filed Jul. 21, 2022, the disclosure of which is incorporated by reference herein in its entirety.

FIELD

The present disclosure relates to the field of resource management for the processing and/or distribution in dynamic mode of multimedia content, in particular for the management of computational resources of a video encoder for encoding multimedia content and/or the management of network resources of a distribution network configured for distributing encoded multimedia content in dynamic mode.

BACKGROUND

Media consumption is increasingly shifting from traditional broadcast TV (over-the-air, satellite, and cable) to so-called over-the-top (OTT) streaming over the public Internet. The antennas and set-top boxes associated with traditional TVs are replaced by software media players that run on smartphones, tablets, PCs, connected TVs and game consoles.

OTT media distributors encode the content in multiple formats through so-called Adaptive Bit-Rate (ABR) profiles for a variety of reasons, such as use for streaming of an unmanaged network, need to accommodate a variety of devices, distribution of content offered in different languages, need to encode content in both High Dynamic Range (HDR) and Standard Dynamic Range (SDR), etc.

It would be advantageous to improve the management of resources used for encoding multimedia content streams for distribution to viewing devices in dynamic mode, in particular through distribution networks using an OTT infrastructure.

There is therefore a need for providing an improved encoder resource management scheme and apparatus and software implementing the same that address at least some of the above-described drawbacks and shortcomings of the conventional technology in the art.

SUMMARY

It is an object of the present subject disclosure to provide an improved resource management scheme for multimedia content encoding and apparatuses implementing the same.

Another object of the present subject disclosure is to provide an improved multimedia content encoder resource management scheme and apparatuses implementing the same.

Another object of the present subject disclosure is to provide an improved dynamic encoder configuration scheme and apparatuses implementing the same for alleviating the above-described drawbacks and shortcomings of conventional schemes, in particular schemes provided by orchestration software solutions usable to deploy applications that require real-time or near real-time data processing.

To achieve these objects and other advantages and in accordance with the purpose of the present subject disclosure, as embodied and broadly described herein, in one aspect of the present subject disclosure, a computer-implemented method for managing the encoding of a multimedia content stream distributed in dynamic mode to viewing devices through a distribution network according to a set of profiles comprising a plurality of multimedia data distribution profiles usable by the viewing devices for reception of the multimedia content stream is proposed, which comprises, by a processing node of the distribution network: obtain usage statistics data for at least one of the multimedia data distribution profiles, wherein the usage statistics data represents (in embodiments describes, in embodiments quantifies) usage, by the viewing devices, of the at least one multimedia data distribution profile for receiving the multimedia content stream; based on the usage statistics data, update the set of profiles by excluding the at least one of the multimedia data distribution profiles from the set of profiles; determine, based on the updated set of profiles, a configuration of an encoder used for encoding the multimedia content stream distributed to the viewing devices; and update the encoding of the multimedia content stream by the encoder based on or according to the determined encoder configuration. Therefore the multimedia content stream may be encoded by the encoder according to the newly determined encoder configuration.

The proposed scheme advantageously provides an automatic and potentially continuous scheme for reconfiguring the encoder used for encoding a multimedia content stream distributed in dynamic mode to viewing devices through player analytics providing usage data statistics of these viewing devices fed back to a processing node of the distribution network. The encoder can advantageously be reconfigured in order to decrease the amount of resources used for encoding and distributing the multimedia content stream according to multimedia data distribution profiles through management of these profiles, for example by excluding a selected profile, based on the usage data statistics obtained for the selected profile. The number of profiles according to which the encoder generates encoded streams for the multimedia content distribution stream, whether video profiles, HDR/SDR profiles, audio profiles, etc. may be decreased in order to decrease the amount of resources used for encoding and distributing the multimedia content stream.

In one or more embodiments, the plurality of multimedia data distribution profiles may be a predefined set of multimedia data distribution profiles usable by the viewing devices for reception of multimedia content streams.

In one or more embodiments, the set of profiles may be updated by deleting the at least one of the multimedia data distribution profiles from the set of profiles.

In one or more embodiments, the set of profiles may comprise, for each of the plurality of multimedia data distribution profiles, a profile status, and wherein the set of profiles is updated by switching the profile status of the at least one of the multimedia data distribution profiles from the set of profiles from active to inactive.

In one or more embodiments, each of the plurality of distribution profiles may comprise a bitrate value, a quality setting value, a resolution value, a HDR/SDR encoding profile, a video codec profile, an audio codec profile, and/or one or more closed caption track profiles.

In one or more embodiments, the usage statistics data may comprise respective usage statistics data obtained for each of a plurality of the multimedia data distribution profiles.

In one or more embodiments, the set of profiles may be updated based on a comparison of the usage statistics data with a first threshold.

In one or more embodiments, the usage statistics data for the at least one of the multimedia data distribution profiles may comprise a percentage of viewing devices that are using the at least one of the multimedia data distribution profiles.

In one or more embodiments, the usage statistics data may be obtained by collecting statistics on usage of the at least one of the multimedia data distribution profiles for a first predetermined time period.

In one or more embodiments, the proposed method may further comprise: obtain statistics data on a number of downshifts and upshifts per viewing device over a second predetermined period of time with respect to the updated set of profiles. In some embodiments, the proposed method may further comprise: based on the statistics data on a number of downshifts and upshifts per viewing device, determine an average number of downshifts and upshifts per viewing device, and based on a comparison of the average number of downshifts and upshifts per viewing device with a second threshold, perform another update of the set of profiles by including in the set of profiles a multimedia data distribution profile that was previously excluded from the set of profiles. In one or more embodiments, the multimedia data distribution profile may be selected among multimedia data distribution profiles that were previously excluded from the set of profiles based on a comparison of a bitrate value of the multimedia data distribution profile with respective bitrate values of the multimedia data distribution profiles that were previously excluded from the set of profiles.

In one or more embodiments, the set of profiles may be updated based on the usage statistics data by excluding at most a predetermined number of multimedia data distribution profiles from the set of profiles. In some embodiments, the multimedia data distribution profiles excluded from the set of profiles comprise a first and second multimedia data distribution profiles, the method further comprising: determining, based on the first and second multimedia data distribution profiles, an intermediate multimedia data distribution profile, and including in the set of profiles the intermediate multimedia data distribution profile.

In another aspect of the present subject disclosure, an apparatus is proposed, which comprises a processor, and a memory operatively coupled to the processor, wherein the apparatus is configured to perform a method according to one or more embodiments proposed in the present subject disclosure.

In yet another aspect of the present subject disclosure, a non-transitory computer-readable medium encoded with executable instructions which, when executed, causes an apparatus comprising a processor operatively coupled with a memory, to perform a method according to one or more embodiments proposed in the present subject disclosure, is proposed.

For example, in some embodiments, the present subject disclosure provides a non-transitory computer-readable medium encoded with executable instructions which, when executed, causes an apparatus comprising a processor operatively coupled with a memory, to to perform a method for managing the encoding of a multimedia content stream distributed in dynamic mode to viewing devices through a distribution network according to a set of profiles comprising a plurality of multimedia data distribution profiles usable by the viewing devices for reception of the multimedia content stream, which comprises: obtain, by the processor, usage statistics data for at least one of the multimedia data distribution profiles, wherein the usage statistics data represents (in embodiments describes, in embodiments quantifies) usage, by the viewing devices, of the at least one multimedia data distribution profile for receiving the multimedia content stream; based on the usage statistics data, update, by the processor, the set of profiles by excluding the at least one of the multimedia data distribution profiles from the set of profiles; determine, by the processor, based on the updated set of profiles, a configuration of an encoder used for encoding the multimedia content stream distributed to the viewing devices; and update, by the processor, the encoding of the multimedia content stream by the encoder based on or according to the determined encoder configuration.

In yet another aspect of the present subject disclosure, a computer program product comprising computer program code tangibly embodied in a computer readable medium, said computer program code comprising instructions to, when provided to a computer system and executed, cause said computer to perform a method according to an embodiment proposed in the present subject disclosure, is proposed.

In another aspect of the present subject disclosure, a data set representing, for example through compression or encoding, a computer program as proposed in the present subject disclosure, is proposed.

It should be appreciated that the present subject disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which:

FIG. 1a shows a table that includes an exemplary set of multimedia data distribution profiles according to one or more embodiments of the present subject disclosure;

FIG. 1b shows a table that includes exemplary usage statistics data according to one or more embodiments of the present subject disclosure;

FIG. 4a illustrates an exemplary algorithm that may be used in one or more embodiments of the present subject disclosure;

DETAILED DESCRIPTION

Figure 2:
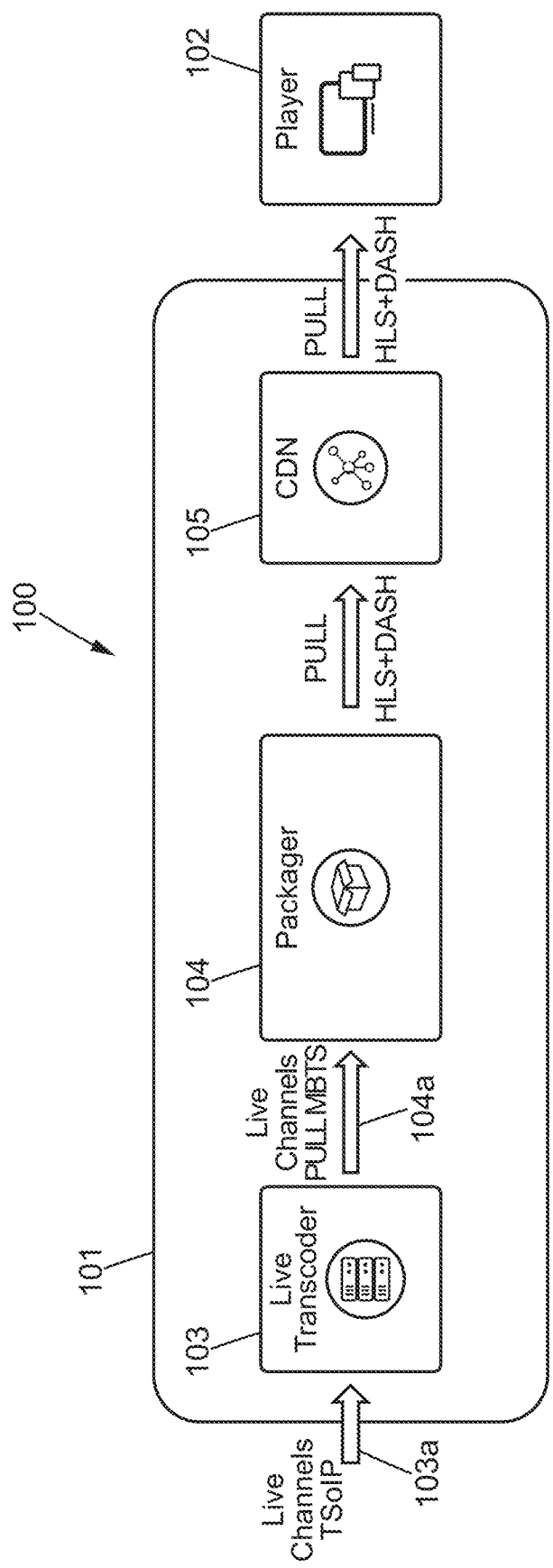
FIG. 2 shows an exemplary multimedia content distribution system according to one or more embodiments of the present subject disclosure.

For simplicity and clarity of illustration, the drawing figures illustrate the general manner of construction, and descriptions and details of well-known features and techniques may be omitted to avoid unnecessarily obscuring the discussion of the described embodiments of the present subject disclosure. Additionally, elements in the drawing figures are not necessarily drawn to scale. For example, the dimensions of some of the elements in the figures may be exaggerated relative to other elements to help improve understanding of embodiments of the present subject disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to units, functions, engines, block diagrams and flowchart illustrations of the methods, systems, and computer program according to one or more exemplary embodiments. Each described unit, function, engine, block of the block diagrams and flowchart illustrations can be implemented in hardware, software, firmware, middleware, microcode, or any suitable combination thereof. If implemented in software, the units, functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fibre, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

"Server" or "platform" in the present subject disclosure means any (virtualized or non-virtualized) point of service or computer device or system performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A server or platform may be configured to operate in or as part of a cloud computing environment. A computer device or system may be configured so as to send and receive signals, via wireless and/or wired transmission networks(s), or be configured so as to process and/or store data or signals, and may therefore operate as a server. Equipment configured so as to operate as a server may thus include, by way of non-limiting example, dedicated servers mounted on a rack, cloud-based servers, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

The terms "application," "program," or "application program" (AP) and their variants ("app", "web app", etc.) as used in the present description correspond to any tool that operates and is operated by way of a computer in order to provide or execute one or more function(s) or task(s) for a user or another application program. In order to interact with an application program and control it, a user interface may be provided on the equipment on which the application program is implemented. For example, a graphical user interface (or GUI) may be generated and displayed on a screen of the user equipment, or an audio user interface may be played back to the user using a speaker, a headset or an audio output.

The terms "media data", "media content", "multimedia data", and "multimedia content" as used interchangeably in the present description correspond to any audio, video, and/or text, or audiovisual data content, with or without closed captions, open captions, subtitles, timed text or visual descriptors.

The terms "computational resources" or "CPU resources" are used interchangeably in the present description to denote any computing or Central Processing Unit (CPU) resource usable on a computing platform for processing (e.g. encoding or transcoding) multimedia content, including without limitation one or more resources corresponding to one or more of the following types of processing resources and processing resource parameters: number of CPU cores, number of GPU cores, type of CPU architecture (e.g. RISC vs. CISC), type of processing unit (CPU, GPU, FPGA), CPU core speed, RAM resources (including one or more of the following: RAM size, RAM speed, etc.) associated with computational resources, storage type resources (hot vs. cold, etc.). In one or more embodiments, the computational resources may be allocated in CPU core units, so that the proposed scheme may comprise, depending on the embodiment, the determination of a number of CPU cores to be allocated to a channel corresponding to a multimedia content stream to be encoded, or the determination of respective numbers of CPU cores to be respectively allocated to channels corresponding to multimedia content streams.

In the present description, the terms "real-time" distribution, distribution "in linear mode", distribution "in linear TV mode", distribution "in dynamic mode" and "live" distribution or distribution "in live mode" are used interchangeably to denote the distribution in live mode or dynamic mode of multimedia content in a content distribution system to terminals, comprising in particular the distribution of the content as it is generated, as opposed to distributing content generated previously, upon an access request from a user (distribution upon an access request or "static" distribution or distribution in static mode), such as for example content recorded on a server and made available to users by a video on demand (VOD) service. Likewise, the terms "live encoding" or "live transcoding" are used interchangeably to denote the encoding (respectively the transcoding) of multimedia content distributed in live mode or in dynamic mode. The terms "non-linear", "non-linear TV", "non-linear TV mode", "non-linear TV services", "non-linear services", "static distribution", and "distribution in static mode" are used interchangeably to denote the distribution, upon and subject to an access request from a user, of previously generated content, such as for example content recorded on a server and made available to users by a video on demand (VOD) service, a PauseTV service, a Start-Over service, a CatchUp-TV service, a Replay service or a CloudDVR service.

In the present description, the term "real-time" as used herein in the context of video distribution, video encoding or compressing video content, refers to the encoding or compression of video content at least at the same speed, for example expressed in frames per second, as it is generated by one or more video content sources. For instance, if content is generated at 50 frames per second (fps) it will be deemed encoded in real-time as long as it is also encoded at at least 50 fps.

In the present description, the terms "live content" or "live channel" are used interchangeably to denote or refer to corresponding content, for example multimedia content, of a multimedia content stream, that is distributed, for example using an Over-The-Top (OTT) distribution mode, in dynamic mode (as opposed to the static distribution mode). Live content will typically be generated by a television station, or by any type of television medium, and may also be distributed on a multimedia content broadcast network, in addition to being made available on content servers in an OTT distribution system.

In the present description, the terms "viewing device", "terminal", "user equipment", "reader", "reading device", "reading terminal", "video reader", are used interchangeably to denote any type of device, implemented by one or more items of software, one or more items of hardware, or a combination or one or more items of software and one or more items of hardware, configured so as to use multimedia content distributed in accordance with a distribution protocol, for example a multi-screen distribution protocol, in particular by loading and by reading the content. The terms "client" and "video-reading client" are also used interchangeably to denote any type of device, software and/or hardware, or any function or set of functions, implemented by software and/or hardware within a device and configured so as to use multimedia content distributed in accordance with a distribution protocol, for example a multi-screen distribution protocol, in particular by loading the content from a server and by reading the content.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols and interoperate with larger networks. Various types of equipment may be used to make various architectures or various protocols interoperable. For example, a router may be used to provide a communication link or a data link between two LANs that would otherwise be separate and independent.

The proposed methods may be implemented by any video encoder or video codec configured for encoding or encoding and decoding images (or frames) of input video data, in particular configured for encoding and/or encoding and decoding live video content in real-time or near real-time, such as, for example, a video encoder and/or codec compliant with the any of the H.261, MPEG-1 Part 2, H.262, MPEG-2 Part 2, Alliance for Open Media (AOM) AV1, H.264/AVC, H.265/HEVC, MPEG-4 Part 2, SHVC (Scalable HEVC), H.266/VVC, and MPEG-5 EVC specifications or standards, whether in their existing versions and/or their evolutions, as the case may be adapted for implementing one or more embodiments of the proposed methods.

One of the outgrowths of the streaming industry is the proliferation of player instrumentation software tools. These tools are software that are also installed on the playback device, and which integrate closely with the player software. They collect enormous amounts of information about player technical performance—such as which bitrates from the Adaptive Bit-Rate (ABR) profiles are being displayed, how often the video freezes, measurements of end-to-end latency, etc.—and content consumption (how many people viewed a particular movie or sportscast, what devices were used for content consumption, which streams were abandoned before the end, etc.). This information, referred to as "player analytics" in the present subject disclosure, is conventionally used in VOD systems a posteriori to both improve player performance (and therefore the Quality of Experience for the end user) through VOD configuration, and optimize content offerings to suggest popular contents to end users based on prior consumed contents identified in the player analytics.

Codec elasticity is a feature that designates the ability for a codec (e.g. a video codec) to modify its configuration (including dynamically), whether automatically or further to a configuration change command (e.g. received through a user interface), in order to achieve one or more predetermined performance quality vs. computational complexity compromises.

The present subject disclosure advantageously proposes using player analytics data to dynamically update a configuration of a multimedia (e.g. video) codec or multimedia (e.g. video) encoder configured for encoding one or more multimedia content streams distributed in dynamic mode to viewing devices through a distribution network, such as for example an OTT network.

One of the characteristics of ABR streaming is the need to encode the same content in multiple formats. This may be done for a variety of reasons, such as:

Streaming is often done on an unmanaged network with bandwidth fluctuating in an unpredictable manner. The content is therefore encoded at different video resolutions and bitrates. FIG. 1a shows a table of 12 exemplary video resolution and average bitrate profiles usable for encoding a 4K source with HEVC at 30 fps (frames per second);

Content may be encoded using different video and audio codecs to accommodate a variety of devices which may support one or another type of such codecs;

Content may be offered in different languages—therefore different audio tracks and closed captions/subtitles—especially since streaming services are free from the geographical constraints faced by traditional broadcasters; and Content may be encoded in both High Dynamic Range (HDR) and Standard Dynamic Range (SDR) and/or NextGen object-based audio and standard channel-based audio.

FIG. 1a shows an exemplary set of multimedia data distribution profiles usable for the encoding of a multimedia content stream and distribution in dynamic mode to viewing devices through a distribution network.

In the present description and in the figures, such a set of profiles may sometimes be referred to as an "ABR ladder," and a profile may sometimes be referred to as a "variant".

In one or more embodiments, a viewing device may typically be capable of using one or more of the multimedia data distribution profiles for reception of the multimedia content stream.

Therefore, at the network side, a plurality of encoding formats may be used for encoding a multimedia content stream, so that the multimedia content stream may be distributed in dynamic mode to viewing devices through a distribution network according to a set of profiles comprising a plurality of multimedia data distribution profiles usable by the viewing devices for reception of the multimedia content stream.

The video delivery of digital television (also sometimes referred to as live video streaming) has undergone significant changes in recent years. New audiovisual services such as video on demand (VOD), or catch-up TV (or replay) have been added to conventional schemes for linear TV distribution (through ADSL (asymmetric digital subscriber line), satellite, cable, IPTV, fiber, digital terrestrial television (DTT), etc.) carried out in dynamic mode via pay-TV operators (e.g. satellite TV operators and/or Internet service providers (ISPs)).

The design of new terminals (also referred to as "viewing device") that are ever more powerful and more mobile, the growing demand for consumption of content independent of the location of the consumer (TV everywhere), as well as the development of network infrastructures offering ever more bandwidth, have led to the emergence of a new market, sometimes referred to as the over-the-top (OTT) market, that does not require ownership of the access network used by users. The OTT market therefore operates on so-called unmanaged networks (i.e. with bandwidth and quality of service (QoS) not guaranteed). Multi-screen OTT services are provided by broadcasters/rebroadcasters, i.e. television broadcasters and telecom operators.

The infrastructure used for content delivery has thus been doubled, and live video streaming can be performed through different infrastructures and service offerings: an infrastructure for the traditional linear TV distribution, and another infrastructure for the OTT media streaming.

In order to address multi-screen content delivery services, various protocols have been developed: Apple HLS (HTTP Live Streaming), Microsoft Smooth Streaming (MSS), Adobe HTTP Dynamic Streaming (HDS), MPEG Dynamic Adaptive Streaming over HTTP (MPEG-DASH). All of these protocols are based on the concept of http adaptive streaming (HAS).

Multi-screen content delivery typically uses a video delivery network head end comprising a video encoding unit that receives content to be encoded as input and delivers to a packager encoded streams known as "elementary streams". Content received as input is encoded according to a plurality of encoding profiles (a profile being for example defined with codec, resolution and bit-rate parameters).

The encoded streams (elementary streams) delivered by the video encoding unit are split within the packager into at least two sequences, audio and video sequences respectively, of successive segments, the segments generally being of set duration (typically a few seconds) and of format dependent on the chosen protocol (for example MPEG2-TS, MP4, etc.). For each content, a set of metadata relative to multimedia contents, which is sometimes referred to as a media presentation description (MPD), a manifest, or a container, is also generated by the packager, for example in the form of a file (for example in XML format), indicating the characteristics of each profile and the available segments corresponding to the content.

OTT streaming over a Content Delivery Network (CDN) is one commonly used infrastructure for live as well as VOD streaming. In these schemes, the manifests and the associated segments are typically supplied by the packager to a content server (sometimes referred to as the "Origin server"), then stored on a CDN which provide cache capacities that makes it possible to improve quality of service, and to minimize access times and the latency with which content may be viewed by player terminals.

For playing multimedia content (e.g. a multimedia content stream) delivered in dynamic mode, or in other words dynamic or live video content (as opposed to static video content, such as VOD content for example), a terminal (viewing device) (for example a terminal configured within a user device such as a smartphone, tablet or any type of computer) will typically be configured to play this multimedia content using the information contained in the manifest associated with the multimedia content.

As discussed above, OTT media distributors typically encode multimedia content in multiple formats for a variety of reasons.

This may easily lead to a large combination of encoding formats (multiple codecs×multiple resolutions/bitrates per codec+multiple audio and closed caption tracks, etc.). However, in a live streaming application, encoding resources may be expensive and/or limited.

Yet each live streaming session may have its own audience, which connect to the Internet using different devices with their own unique networking capabilities, and different language requirements. This per-session information is available thanks to the player analytics data.

From the terminal standpoint, the terminal (viewing device) will also have selected a multimedia data distribution profile (e.g. an ABR profile) among a plurality of multimedia data distribution profiles distributed over the CDN that are usable by the viewing devices for reception of the multimedia content stream, for example according to its capabilities.

FIG. 1b shows a table that includes, for each multimedia data distribution profile shown on FIG. 1a, exemplary statistics representing usage over a period of 5 minutes of the profile by the viewing devices playing a multimedia content stream distributed in dynamic mode to viewing devices through a distribution network according to the set of profiles of FIG. 1a.

More specifically, the table of FIG. 1b corresponds to the table of FIG. 1a with for each resolution/average bitrate profile listed in the table, statistics data showing the percentage of viewing devices streaming, that is, using the corresponding profile.

As shown on FIG. 1b, profile #2 is streamed by 22% of the viewing devices, profile #4 is streamed by 30% of the viewing devices, profile #7 is streamed by 18% of the viewing devices, and profile #9 is streamed by 23% of the viewing devices. That is, the table of FIG. 1b shows a hypothetical case wherein 93% of viewing devices are streaming one of 4 profiles (shown in bold in the last columns) while the remaining 8 profiles are each used by 2% or less of the users. Such statistics may in some embodiments advantageously be obtained and used according to the present subject disclosure when it may be considered that some 'steady-state' has been reached. For example, such steady state may be deemed reached as of 15 minutes from the start of an event (such as a football match, concert, presidential debate, etc.), and statistics may be collected for a 5-minute duration, that is, between T=15 and T=20 minutes from the start of the event.

In one or more embodiments, a steady-state may be considered reached when the number of viewers has stabilized (accounting for late comers which may cause the number to grow significantly during the first few minutes of an event), and changes by less than a predefined percentage (e.g. less than 1 or 2 percent) over a predefined time interval (e.g. a 5-minute time interval). A reach time of a steady-state may in some embodiments be tracked by the player instrumentation software.

As provided by the present subject disclosure, advantageously for live streaming applications such as sportscasts, in one or more embodiments, there is an opportunity to optimize resource consumption (CPU, bandwidth, CDN cache capacity, etc.) by establishing a 'feedback loop' between the player and various components in the workflow. In particular, in one or more embodiments, the configuration of the encoders may advantageously be updated during a live session (therefore dynamically updated) based on the player analytics data.

As provided by the present subject disclosure, player analytics data may therefore advantageously be used in one or more embodiments as an encoder configuration criterion.

The proposed method may advantageously be implemented in video encoders that are elastic, that is, that can be dynamically configured with respect to allocating resources (e.g. computational resources) for encoding one or more multimedia content streams distributed in dynamic mode to viewing devices through a distribution network based on one or more configuration criteria.

FIG. 2 shows an exemplary multimedia content distribution system 100 according to one or more embodiments of the subject disclosure.

Shown on FIG. 2 is a system 100 comprising multimedia (e.g. video) content distribution subsystem 101 configured to deliver multimedia content to one or more terminals (shown as players 102) at the end of a distribution chain, for example upon request of such players.

As illustrated in FIG. 2, the subsystem 101 may typically comprise a transcoder subsystem 103 configured for receiving content to be encoded (live channels 101a) as input data, and for delivering to an Origin/Packager subsystem 104 encoded streams. A content received as input by the transcoder 103 is encoded according to a plurality of encoding profiles (a profile being for example defined with codec, resolution and bit-rate parameters) to generate a plurality of encoded multimedia content streams (which may also be referred to as "source media flows" or "elementary streams") with different quality levels which are output as live channels 104a to the packager 104. Using a plurality of encoding profiles has at least two advantages: First of all, a plurality of profiles makes it possible to address player terminals with different characteristics (supported codecs, screen resolution, decoding power). Furthermore, it allows the video players of these terminals to adapt depending on the available network bandwidth. Specifically, the player of a client (of a terminal) may be configured to seek to achieve the encoding profile corresponding to the highest bit rate, depending on bandwidth measurements that it continuously performs.

The encoded streams delivered by the transcoder 103 to the packager 104 are split by the packager 104 into two sequences, audio and video sequences respectively, of successive segments, these segments generally being of set duration (typically a few seconds) and of format dependent on the chosen multimedia content distribution protocol (for example MPEG2-TS, MP4, etc.). For each content, a set of metadata relative to multimedia contents, or manifest, is also generated by the packager 104. The manifest may typically take the form of a file, for example in XML format, indicating the characteristics of each encoding profile and the available segments corresponding to the content.

The packager subsystem 104 may therefore typically be configured to receive as input the encoded streams, and to generate OTT content comprising manifests and associated segments upon request received from a player 102 through a data communication network 105 to which it is connected. The data communication network 105 may comprise one or more Content Delivery Networks (CDN) networks which may be provided in the subsystem 101 as an intermediary between the terminals 102 and the packager subsystem 104 configured for serving requests for content originated from the terminals 102. The CDN networks 105 may provide cache capacities that make it possible to improve the quality of service provided to users, and to minimize access times and the latency with which content may be viewed by player terminals 102.

The contents stored in servers of the CDN networks 105 are read accessible to user terminals (102), by means of a service platform for the delivery of the contents. Clients installed in the terminals (102) may access the contents stored on the CDN servers via one or more data communication networks, such as for example the Internet (not represented in the figure).

Content received by the transcoder subsystem 103 may be uncompressed or very lightly compressed. For example, the transcoder subsystem 103 may be configured to receive uncompressed video content which may be transported using a data communication link suitable for carrying raw video content, such as an SDI (Serial Digital Interface) link, a TSoIP (Transport Stream over IP) link or a HDMI (High-Definition Multimedia Interface) link. As illustrated in FIG. 2, uncompressed content may be provided to the transcoder subsystem 103 using a TSoIP link. A person of ordinary skill in the art would understand that any type of link suitable for transporting uncompressed or very lightly compressed video content may be used in place of the TSoIP links of FIG. 2, which are provided as an example only.

The transcoder subsystem 103 may be configured for encoding/compressing received channels in live mode, that is, as they are received, and to also output encoded channels in live mode, that is, as they are produced.

As illustrated on FIG. 2, in one or more embodiments the transcoder subsystem 103 comprises one or more transcoding servers, which may comprise one or more encoding and/or transcoding engines, also referred to in the following as source encoders. These one or more servers are preferably configured for encoding content (such as video content and/or audio content) for each "Live Channels" received by the transcoder subsystem 103. In some embodiments the servers may be configured for encoding in real-time different types of content (for example different types of video content) at corresponding transcoding points along the transcoding workflow.

Content output by the transcoder subsystem 103 to the packager subsystem 104 may be transported using a data communication link suitable for carrying compressed video content, such as for example a Multi Bitrate Transport Stream (MBTS) link as illustrated on FIG. 2. In one or more embodiments, the media stream output to the packager subsystem 104 may be a media stream supporting low-latency, that is, a media stream which is configured for use in media distribution systems supporting low-latency. Such a media stream may carry information indicating a chunk structure, in addition to carrying information indicating a fragment structure, and/or a segment structure in addition to carrying media data.

A person of ordinary skill in the art would understand that any type of network suitable for providing fast delivery of Internet content, such as video content, may be used in place of the CDN 105 of FIG. 2, which is provided as an example only, and that any format suitable for transmission of multimedia content, such as video content, with very low latency, may be used, such as the CMAF (Control Media Application Format) format, which is provided as an example only. Using a CDN advantageously allows leveraging the existing CDN infrastructure, whether public or private, for data communication between the packager 104 of the system and a terminal 102 (which may for example be a player embedded in a computer, a smartphone or a tablet at a users' site).

A "pull"-type data communication mechanism may typically be used for data communication between the transcoder 103 and the packager 104, and between the terminal 102 and the packager 104 through the CDN 105, according to which the packager 104 (respectively the terminal 102) may request data from the transcoder 103 (respectively the packager 104) as it is ready to receive such data (through the CDN for the terminal 102). In this case, data communication would be guided by the packager 104 (respectively the terminal 102) instead of the transcoder 103 (respectively the packager 104).

The packager 104 may typically be configured for generating files suitable for corresponding media transport protocols and readable by the terminal which requested the content. In an OTT distribution system, content generated by the packager may be referred to as OTT content, that is, content that may be distributed to terminals using data communication mechanisms used in OTT distribution, such as the HLS protocol, the MSS protocol, the HDS protocol and the MPEG DASH protocol.

Standard OTT packaging operates by generating and publishing as soon as possible, that is without waiting for a request for content, all contents for all OTT protocols.

Conventional orchestrations of streaming services are blind to audience measurement, even though audience measurement influences performances of some orchestration solutions. Therefore an improved orchestration solution may be obtained by being configured to be aware of this metric, possibly in addition to other metrics, such as video content complexity, in order to advantageously make a better use of computational resources, for example on a private or public cloud, and better exploit the codec elasticity.

An "orchestration software" (also referred to as an "orchestrator") is a software solution that can be used for deploying applications such as micro-services applications through various deployment possibilities in units of software that package up a code and its dependencies for running quickly and reliably on any computing environment. Orchestration software, such as Kubernetes, typically manage various aspects of the units of software, including the allocation of physical (hardware) resources (e.g. CPU, memory), network and service planning and automation. For example, an application executed through an orchestration software may be a video processing application program, such as a video encoding and/or encoding and decoding program, or a video transcoding program.

As video processing applications (e.g. video coding applications) may advantageously use an orchestration software solution, an orchestrator may advantageously be used in the transcoder 103 of FIG. 2.

In one or more embodiments, the orchestrator may further be configured to monitor one or more relevant parameters for one or more of the live channels that are being encoded, and calculate and dynamically apply, possibly in real-time, an optimal computational resource allocation for one or more of these channels.

Figure 3:
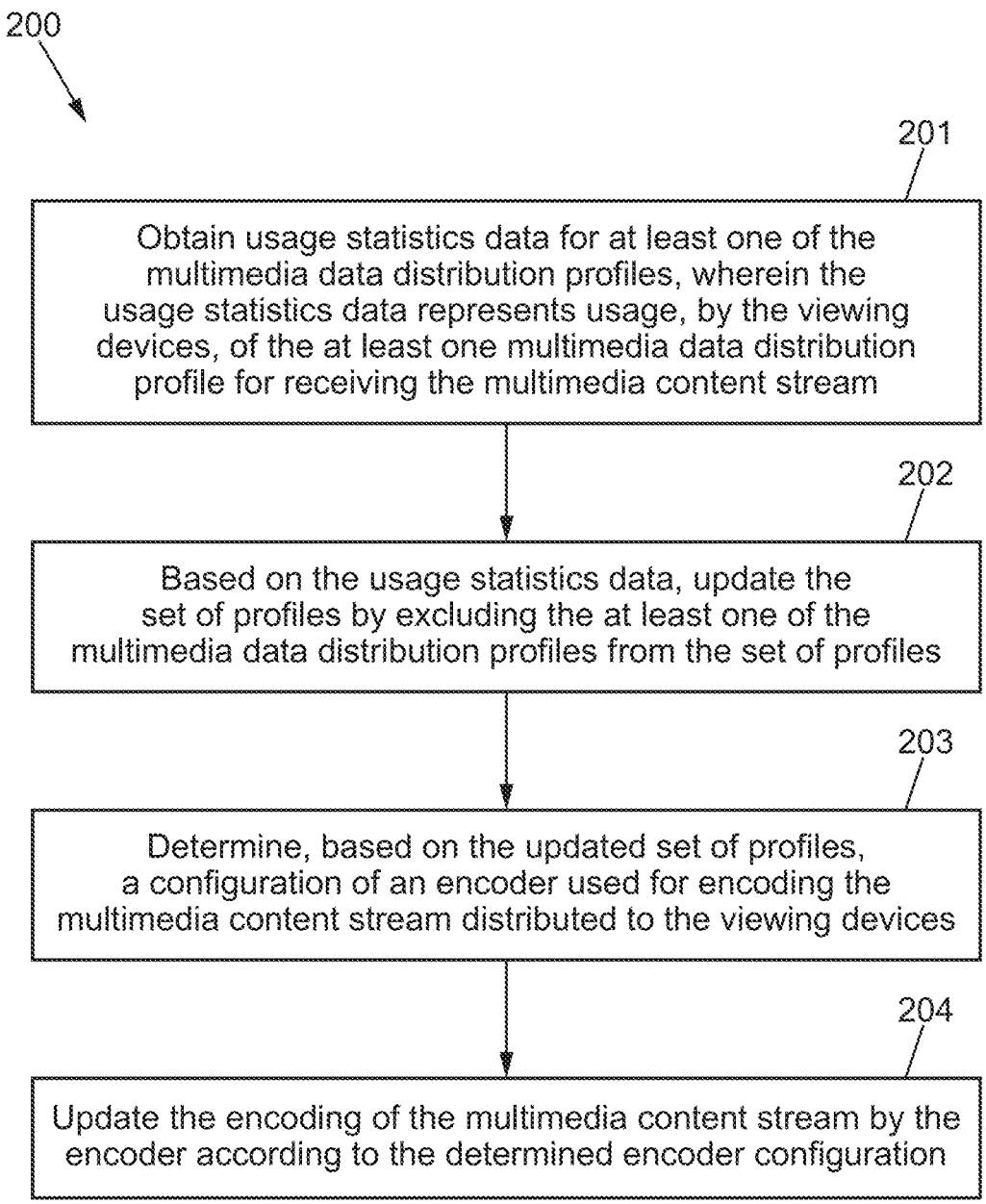
FIG. 3 is a block diagram of a method for managing the encoding of a multimedia content stream according to embodiments of the present subject disclosure.

FIG. 3 is a block schematic diagram of a method (200) for managing the encoding of a multimedia content stream according to embodiments of the present subject disclosure.

The exemplary method illustrated by FIG. 3 may advantageously be implemented on a computing platform comprised in a processing node (e.g. video processing node) of a distribution network through which one or more multimedia content streams are being distributed in dynamic mode, such as the exemplary transcoder 103 shown on FIG. 2.

One may therefore consider for implementation of embodiments of the proposed method a computing platform for processing one or more multimedia content streams distributed in dynamic mode to viewing devices through a distribution network, each of the multimedia content streams being encoded according to a set of profiles comprising a plurality of multimedia data distribution profiles usable by the viewing devices for reception of the multimedia content stream.

Operations of the proposed method according to embodiments of the present subject disclosure may be performed while a multimedia content stream is being encoded and distributed in dynamic mode to viewing devices through the distribution network.

Depending on the embodiment, each profile of the plurality of multimedia data distribution profiles may comprise a video profile (for example comprising a bitrate value, a quality setting value, and/or a resolution value), a HDR/SDR encoding profile, a video codec profile, an audio codec profile, and/or one or more closed caption track profiles.

The computing platform may in some embodiments comprise a proposed resource management unit that may be configured to operate as part of or, depending on the embodiment, in combination with an orchestration software solution. The orchestration software may in some embodiments contain one or more clusters, each cluster comprising a cluster management node and one or more cluster computing nodes, with each cluster computing node comprising one or more cluster nodes. The proposed method may be implemented in a cluster of the orchestration software which comprises a cluster management node and at least one cluster node running a video processing application program, possibly comprised in a cluster computing node of the cluster.

The proposed method may advantageously be implemented on a resource management unit, which may be implemented in software, hardware, or as a combination of software and hardware. In one or more embodiments, the proposed resource management unit may be implemented as a software program running on a server. Depending on the embodiment, the server on which the resource management unit is implemented may or not be distinct from a server on which the orchestration software is running, in which case the resource management unit may be configured with a data communication interface for data communication with the cluster management node of the orchestration software.

In some embodiments, the resource management unit may be implemented as a software program running on the same server (e.g. a Linux server) as the one on which the orchestration software is running. In some embodiments in which the resource management unit and the orchestration software are configured to run on the same server (e.g. a Linux server), the resource management unit may be implemented as a software program running in the cluster node (e.g. a Kubernetes Pod) in which the video processing application program is running.

In one or more embodiments, the processing node of the distribution network may be configured to obtain (201) usage statistics data for at least one of the multimedia data distribution profiles. The usage statistics data may represent or, depending on the embodiment, describe usage, by the viewing devices, of the at least one multimedia data distribution profile for receiving the multimedia content stream. In some embodiments, the usage statistics data may quantify the usage, for example in the form of a percentage of all viewing devices using one of the multimedia data distribution profiles, of the multimedia data distribution profile for receiving the multimedia content stream. In some embodiments, the usage statistics data for the at least one of the multimedia data distribution profiles may comprise a percentage of viewing devices that are using the at least one of the multimedia data distribution profiles.

Using a percentage of viewing devices advantageously allows using a numerical metric based on which a comparison between different profiles can be performed, and/or a comparison of a profile with a threshold can be performed.

For example, referring again to FIG. 1b, the usage statistics data for profile #1 may comprise data representing that 2% of the viewing devices are using profile #1 for receiving the multimedia content stream, the usage statistics data for profile #2 may comprise data representing that 22% of the viewing devices are using profile #2 for receiving the multimedia content stream, the usage statistics data for profile #3 may comprise data representing that 1% of the viewing devices are using profile #3 for receiving the multimedia content stream, etc.

In one or more embodiments, usage statistics data may be obtained through a player instrumentation software tool installed on the viewing devices and configured for identifying and feeding back to the processing node of the distribution network which multimedia data distribution profile among a plurality of usable multimedia data distribution profile (e.g. ABR profiles) is being used by the viewing device.

Depending on the embodiment, usage statistics data may be generated by one or more network nodes (including viewing devices) other than the processing node of the distribution network, and transmitted to the processing node, or may be generated by the processing node based on data received from one or more network nodes (including viewing devices) other than the processing node.

Therefore, depending on the embodiment, the processing node of the distribution network may obtain, for at least one of the multimedia content streams distributed through the distribution network, usage statistics data corresponding to at least one of the multimedia data distribution profiles and representing use of such at least one of the multimedia data distribution profiles for receiving the at least one of the multimedia content streams.

In one or more embodiments, the processing node may be further configured to update (202), based on the usage statistics data obtained for the at least one of the multimedia data distribution profiles, the set of profiles with respect to the at least one of the multimedia data distribution profiles from the set of profiles.

Therefore, advantageously, the processing node may use the usage statistics data obtained for the profile for updating the set of profiles with respect to the profile, so that the set of profiles may be managed by taking into account usage by the viewing devices of the profile of interest.

For example, in one or more embodiments, the processing node may update the set of profiles by excluding the at least one of the multimedia data distribution profiles from the set of profiles. In some embodiments, the set of profiles may be updated by deleting the at least one of the multimedia data distribution profiles from the set of profiles.

In other embodiments, the set of profiles may be updated by deactivating the at least one of the multimedia data distribution profiles from the set of profiles, for example by changing a status thereof. For example, in some embodiments, the set of profiles may comprise, for each of the plurality of multimedia data distribution profiles, a profile status. The profile status may include a binary indicator representing whether the profile is active (that is, usable by viewing devices for receiving a multimedia content stream) or inactive (that is, not usable by viewing devices for receiving a multimedia content stream). The set of profiles may in such embodiments be updated by switching the profile status of the at least one of the multimedia data distribution profiles from active to inactive, thereby preventing further use of the profile by viewing devices for receiving a multimedia content stream.

In one or more embodiments, the processing node may be further configured to determine (203), once the set of profiles has been updated, a configuration of an encoder used for encoding the multimedia content stream distributed to the viewing devices, and to update (204) the encoding (e.g. transcoding) of the multimedia content stream by the encoder according to the determined encoder configuration. In some embodiments, the encoder may be dynamically reconfigured based on the updated set of profiles, and continue encoding the multimedia content stream according to its new configuration.

The proposed scheme therefore advantageously provides a multimedia data distribution profile usage aware orchestration for encoding at least one of one or more multimedia content streams that are distributed in dynamic mode to viewing devices through a distribution network, such as for example an OTT multimedia streaming network. Monitoring usage of one or more profiles based on usage statistics data that can be obtained through player analytics data advantageously allows dynamically adjusting the resources (e.g. computational resources) of the computing platform used for encoding (e.g. transcoding) content of the multimedia content stream through determining a new encoder configuration based on the usage statistics data.

The proposed scheme also advantageously establishes a feedback loop between viewing devices streaming a multimedia content stream and the multimedia content stream encoding and distribution workflow. Specifically, the encoding of the multimedia content stream can be dynamically updated, in particular with respect to profiles according to which encoding is performed, for one or more profiles, based on current usage of such profiles by the viewing devices.

In particular, in some embodiments, based on the obtained usage statistics data, the processing node may determine an allocation of computational resources for configuring the computing platform for encoding (e.g. transcoding) the multimedia content stream.

The proposed scheme therefore advantageously provides, in some embodiments, a player analytics aware orchestration for dynamically configuring the encoding at least one of one or more multimedia content streams that are distributed in dynamic mode to viewing devices through a distribution network, such as for example an OTT multimedia streaming network.

In one or more embodiments, a session may include multiple sub-sets of profile and the set of profiles managed according to the present subject disclosure may comprise one or more of these sub-sets, for purpose of, depending on the embodiment, accommodating both SDR and HDR encoding, or various viewer devices supporting different kinds of codecs, or different audio and closed caption tracks.

For example, in some embodiments, if based on the player analytics feedback providing usage statistics data, all devices in a particular session support a given codec, then the encoder may advantageously be reconfigured to drop all renditions using other codecs, in order to decrease the amount of resources used for encoding the multimedia content stream. In some embodiments, if a viewer using a device requiring the dropped profiles subsequently connects to the event, the encoder may be reconfigured again so that they can be restored. In these embodiments, detection and identification of device type and capabilities when that device joins may be achieved as part of the authentication process to grant access.

As another example with respect to support for multiple languages/closed captions, in some embodiments, if for a particular session no-one is using a particular language, the encoder may be reconfigured so that the corresponding audio track be dropped, in order to decrease the amount of resources used for encoding the multimedia content stream. In some embodiments, viewers that join subsequently and require the dropped language will cause the corresponding audio track to be added back through reconfiguration of the encoder according to the present subject disclosure.

In one or more embodiments, usage statistics data may be obtained for a plurality of the multimedia data distribution profiles, for example for all the multimedia data distribution profiles of the set of profiles, such as illustrated by FIG. 1b in the non-limiting case of a set of 12 resolution/bitrate video profiles for which usage statistics in the form of respective percentages of viewers are obtained.

The set of profiles may therefore advantageously, in some embodiments, be updated with respect to a plurality of profiles included therein for which respective usage statistics data will have been obtained.

In one or more embodiments, the usage statistics data is obtained by collecting statistics on usage of the at least one of the multimedia data distribution profiles for a first predetermined time period. For example, in some embodiments, statistics on usage of one or more profiles of the set of profiles may be collected over a predetermined time window.

In one or more embodiments, the set of profiles may be updated with respect to at least one of the multimedia data distribution profiles based on a comparison of the usage statistics data obtained for the at least one of the multimedia data distribution profiles with a threshold. For example, referring to the exemplary ABR ladder shown on FIG. 1b, the set of 12 profiles of the ABR ladder may be updated with respect to a profile which shows usage statistics inferior to a threshold (which may, depending on the embodiment, be predetermined or dynamically determined) (e.g., depending on the embodiment, 2% or 5%). As shown on FIG. 1b, the set of profiles may be updated based on that profiles #1, #3, #5, #6, #8, #10, #11, and #12 experience usage statistics below or equal to a 2% level. That is, each of these profiles is used by 2% or less of the viewing devices.

In one or more embodiments, the set of profiles may be updated by deleting from the set all the profiles which usage statistics is inferior to a threshold (which may, depending on the embodiment, be predetermined or dynamically determined), so that the encoder encodes the multimedia content stream according to an optimized set of profiles comprising a lower number of profiles, thereby leading to a decrease of resource usage by the encoder. For example, referring to the exemplary ABR ladder shown on FIG. 1b, the set of 12 profiles of the ABR ladder may be optimized by deleting the 8 profiles that experience usage statistics below or equal to a 2% level, and keeping only the 4 remaining profiles, considered as the most popular profiles in terms of viewing device usage. This will advantageously significantly reduce the CPU resources and the bandwidth consumed for encoding and distribution of the multimedia content stream.

The following downsides may however be encountered when updating the set of profiles by deleting any profile which shows usage statistics below or equal to a threshold:

(1) If the number of profiles in the set of profiles reaches a lower limit, there is a risk, in the case of having too few profiles, of creating frequent oscillations where a player device goes back and forth between two profiles that are now too far apart in terms of bitrate;

(2) Keeping the lowest profile does not cost much in terms of resource consumption while deleting it will cause the loss of subscribers (even if it is only 1 or 2%);

(3) Contractual obligations may mean that one must always have one stream at the highest resolution for top-end (highest paying) clients.

Therefore, in one or more embodiments, the proposed scheme may be designed to optimize the number of profiles without impacting to some extent the QoE experienced by the viewers.

In one or more embodiments, statistics data may be obtained on a number of downshifts and upshifts per viewing device over a second predetermined period of time with respect to the updated set of profiles. Such statistics data may advantageously allow detecting a situation in which, once the set of profiles has been updated, a viewing device goes back and forth between two profiles that are now too far apart in terms of bitrate.

In some embodiments, the processing node may be further configured to, based on the statistics data on respective numbers of downshifts and upshifts per viewing device, determine an average number of downshifts and upshifts per viewing device. In some embodiments, the processing node may be further configured to, based on a comparison of the average number of downshifts and upshifts per viewing device with a second threshold, perform another update of the set of profiles by including in the set of profiles a multimedia data distribution profile that was previously excluded from the set of profiles. Therefore, advantageously, oscillations may be reduced, at least for some viewing devices, by reintroducing, in the set of profiles, one or more profiles which had previously been excluded therefrom, thereby increasing the number of profiles in the set of profiles.

In one or more embodiments, the multimedia data distribution profile that is reintroduced in the set of profiles may be selected among multimedia data distribution profiles that were previously excluded from the set of profiles based on a comparison of a bitrate value of the multimedia data distribution profile with respective bitrate values of the multimedia data distribution profiles that were previously excluded from the set of profiles.

In one or more embodiments, the set of profiles may be updated based on the usage statistics data by excluding at most a predetermined number of multimedia data distribution profiles from the set of profiles.

In some embodiments wherein multimedia data distribution profiles excluded from the set of profiles comprise a first and second multimedia data distribution profiles, an intermediate multimedia data distribution profile may be determined and included in the updated set of profiles so as to advantageously generate an intermediate profile that corresponds to two excluded profiles, and avoid abruptly deleting a range of features (e.g. a range of bitrates, quality settings, and/or resolutions) provided by the encoder through the profiles made available to the viewing devices.

Figure 4B:
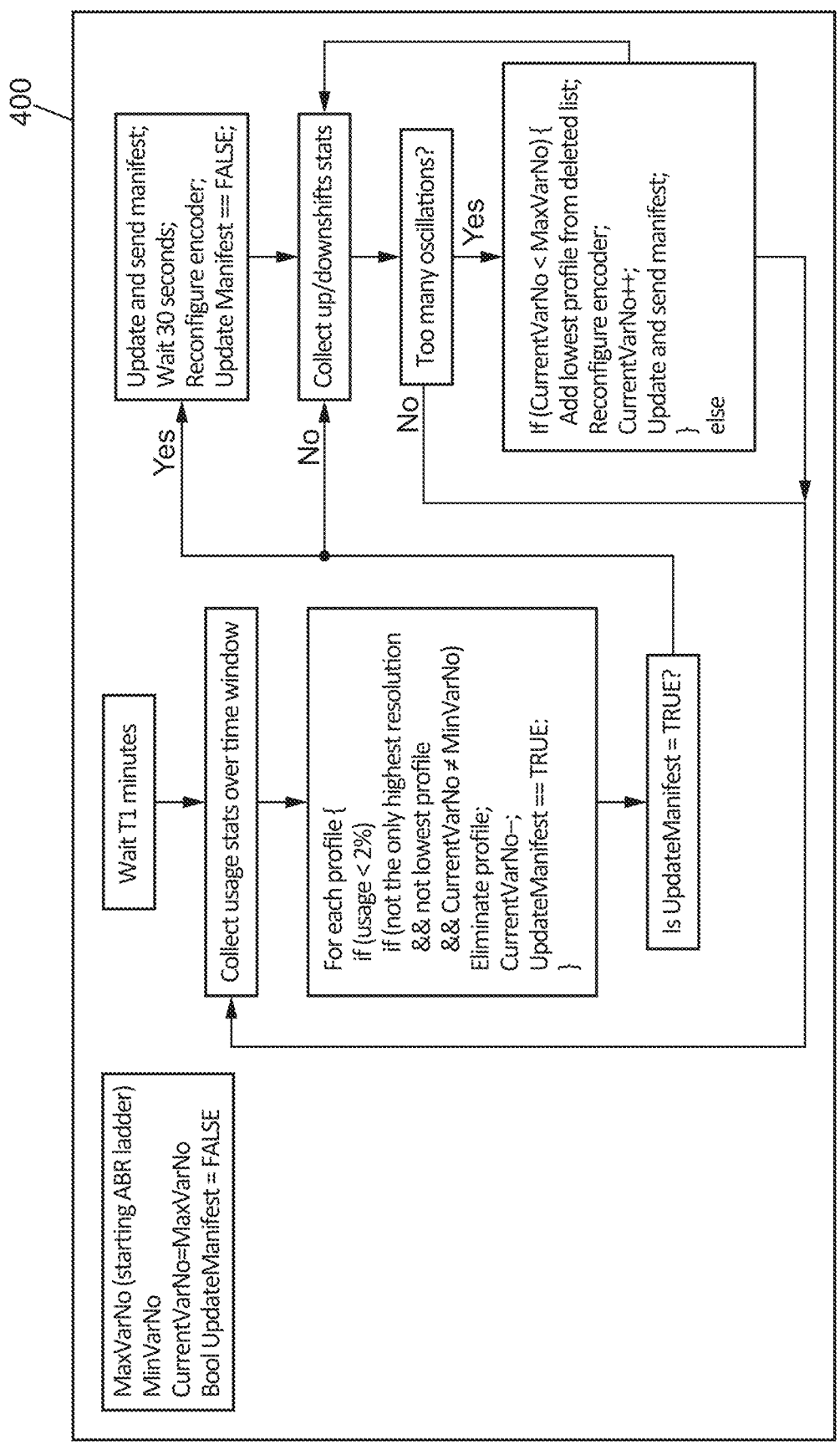
FIG. 4b illustrates an exemplary algorithm that may be used in one or more embodiments of the present subject disclosure.

FIG. 4a illustrates an exemplary encoder configuration management algorithm that may be used in one or more embodiments of the present subject disclosure. FIG. 4b illustrates an exemplary flow chart of the algorithm of FIG. 4a that may be used in one or more embodiments.

A person of ordinary skill in the art would understand that the algorithms of FIGS. 4a and 4b are proposed for illustrative purposes, and that certain operations, steps, or items of these algorithms may be practiced separately, combined together, or substituted for one another, and that a variety of combination and sub-combinations of the operations, steps, or items of these algorithms described below can be made according to the present subject disclosure. In particular, depending on the embodiment, one or more operations, steps, or items of these algorithms described below may be omitted.

The proposed algorithm may consider a channel distributed to viewers that corresponds to a multimedia content stream distributed in dynamic mode to viewing devices of these viewers through a distribution network.

A computing platform configured with a set of resources may be configured for encoding the multimedia content stream for distribution of the encoded streams in dynamic mode through the distribution network according to an initial set of profiles (which may be referred to as an initial ABR ladder) comprising a plurality of multimedia data distribution profiles usable by the viewing devices for reception of the multimedia content stream.

The following four variables are defined for purposes of description of the proposed algorithm according to one or more embodiments:

MaxVarNo: Maximum number of profiles in the set of profiles. In some embodiments MaxVarNo is chosen to correspond to the number of profiles in the initial ABR ladder;

MinVarNo: Minimum number of profiles in the set of profiles;

CurrentVarNo: Current number of profiles in the set of profiles. In embodiments where MaxVarNo is chosen to correspond to the number of profiles in the initial ABR ladder, CurrentVarNo is initially equal to MaxVarNo;

Bool UpdateManifest=FALSE: Update manifest boolean flag initialized to FALSE. The UpdateManifest flag may be set to FALSE to indicate that the manifest file used by viewing devices to receive the multimedia content stream has not been updated, may be set to TRUE to indicate that the manifest file used by viewing devices to receive the multimedia content stream has been updated.

As shown in FIG. 4a, the algorithm may start on an initial ABR ladder (initial set of profiles) containing MaxVarNo profiles. For example, in some embodiments, the initial ABR ladder may correspond to the ladder illustrated by FIG. 1a, which includes 12 video profiles.

In some embodiments, the algorithm may wait for a first predetermined time period (T1-minute window, e.g. of 15 minutes) in order to reach a state considered steady with respect to use of the profiles of the initial ABR ladder before collecting usage statistics data.

In some embodiments, statistics on usage of each profile of the ABR ladder may be obtained (e.g. collected over a second predetermined time period (T2-minute window, e.g. of 5 minutes)), for example in the form of a percentage of viewing devices per profile. In some embodiments, such usage statistics may be obtained once the steady-state is deemed reached.

Profile Management Operations:

In some embodiments, once one or more usage statistics have been obtained, the algorithm may perform the following profile management operations for one or more or, depending on the embodiment, for each of the profiles included in the profile set. Therefore the profile management operations may be performed for a profile (referred to as the "current profile"), and one or more iterations of the profile management operations may be performed depending on the number of profiles for which profile management is to be performed.

In one or more embodiments, the usage of the current profile is compared with a threshold (which may in some embodiments be predetermined) (e.g. set to 2% of the viewing devices streaming the multimedia content stream).

Current Profile Management Operations:

In some embodiments, if the usage statistics for the current profile is less than the threshold, the following current profile management operations are performed:

In one or more embodiments, if the current profile is the only profile in the initial ABR ladder at the highest resolution (among other profiles of the initial ABR ladder): do nothing. This advantageously allows fulfilling contractual obligations which may require that a profile at the highest resolution (among the resolutions of the profiles in the initial ABR ladder) is always available for use for streaming the multimedia content stream at the highest resolution by top-end customers.

In one or more embodiments, otherwise, that is, if the current profile is not the only profile in the set of profile at the highest resolution, and if the current profile has the lowest bitrate in the initial ABR ladder (among other profiles of the initial ABR ladder): do nothing. In some embodiments, if the current profile has the lowest bitrate in the initial ABR ladder (among other profiles of the initial ABR ladder): do nothing. This advantageously allows keeping the lowest resolution profile in the set of profiles, which does not cost much in terms of resource consumption while deleting it would cause the loss of viewing devices streaming the multimedia content stream.

In one or more embodiments, otherwise, that is, if the current profile is not the only profile in the set of profile at the highest resolution, and the current profile does not have the lowest bitrate in the initial ABR ladder, and if the number of profiles in the set of profiles is equal to MinVarNo: do nothing. In some embodiments, if the number of profiles in the set of profiles is equal to MinVarNo: do nothing. This advantageously allows ensuring that the number of profiles in the set of profiles will not be decreased, even though successive iterations of the profile management operations may be performed in some embodiments, under a minimum threshold set to MinVarNo. As a consequence, this advantageously avoids the risk of creating frequent oscillations where a viewing device goes back and forth between two profiles that are too far apart in terms of bitrate, which risk may occur if the number of profiles in the set of profiles gets too low.

In one or more embodiments, otherwise, that is, if the current profile is not the only profile in the set of profile at the highest resolution, the current profile does not have the lowest bitrate in the initial ABR ladder, and the number of profiles in the set of profiles is greater than MinVarNo: exclude the current profile from the set of profiles (e.g. by deleting the current profile in an updated manifest file), in some embodiments update the counter CurrentVarNo (e.g. decrement CurrentVarNo by one), and in some embodiments set the UpdateManifest flag to TRUE. In some embodiments, if the number of profiles in the set of profiles is greater than MinVarNo: exclude the current profile from the set of profiles (e.g. by deleting the current profile in an updated manifest file), in some embodiments update the counter CurrentVarNo (e.g. decrement CurrentVarNo by one), and in some embodiments set the UpdateManifest flag to TRUE. This advantageously allows decreasing the number of profiles in the set of profiles, that is, the number of profiles usable by viewing devices to receive the multimedia content stream, and therefore decreasing the resources required to encode and distribute the multimedia content stream to viewing devices, by excluding from the set of profiles the current profile based on a comparison of the amount of viewing devices using it with a threshold (which may be predetermined or, depending on the embodiment, dynamically adapted).

In some embodiments, if the usage statistics for the current profile is not less than the threshold, some or all of the above-described current profile management operations are not performed.

In some embodiments, the current profile management operations may be deemed completed at this stage of the algorithm.

In one or more embodiments, the algorithm may be configured to prevent that, when performing subsequent iterations of the current profile management operations over a sequence of profiles of the set of profiles, more than a predetermined number of profiles (e.g. two profiles) be removed during one iteration of the profile management operations.

In some embodiments, if two consecutive profiles are excluded from the set of profiles further to performing subsequent iterations of the current profile management operations, then they may be replaced with a single intermediate profile where the bitrate (or the quality in the case of constant Quality or CQ coding) is in between those of the two excluded profiles. The intermediate profile may be generated based on the two excluded profiles, and may be added to the set of profiles by updating the manifest file accordingly, and in some embodiments the current number of profiles CurrentVarNo may be updated (e.g. incremented), while the UpdateManifest flag will have already been set to TRUE.

Encoder Reconfiguration Operations:

In some embodiments, the following encoder reconfiguration operations may be performed at this stage of the algorithm.

In some embodiments, once the current profile management operations are completed, a test to determine whether the manifest was updated is performed.

If the manifest was updated (UpdateManifest==TRUE), the updated manifest may be sent to the viewing devices (for example, in some multimedia data transmission protocols, such as MPEG DASH, an in-band signal may be sent to the devices instructing them to download an updated manifest file), a timer of a predetermined time period (e.g. 30 seconds) may be triggered in order to process in-transit requests, after which the video encoder used for encoding the multimedia content stream may be reconfigured with the new ABR ladder that corresponds to the updated manifest file, and the UpdateManifest flag may be set back to FALSE. Therefore, in some embodiments, an updated manifest file may be sent to the viewing devices in order to inform the viewing devices of the updated set of profiles that will be taken account at the encoder side once reconfigured. In embodiments where the multimedia content file is distributed using the low-latency MPEG DASH protocol, the updated manifest file may be sent to viewing devices by using the concept of a so-called "new period" defined for such protocol. Multiple periods can advantageously be used for the purpose of removing or adding profiles in the set of profiles or even entire adaptation sets (the latter corresponding, for instance, to a certain codec).

In one or more embodiments, statistics on the number of downshifts (viewing devices switching to use of a profile with lower resolution and/or bitrate) and upshifts (viewing devices switching to use of a profile with a higher resolution and/or bitrate profile) over a predetermined time period (e.g. a 5-minute window) may be obtained (e.g. be collected). Further, in some embodiments, statistics on usage of each profile of the new ABR ladder may also be obtained (e.g. collected).

In some embodiments, an average number of downshifts and/or upshifts per viewing device may be obtained (e.g. calculated), and compared with a threshold (which may, depending on the embodiment, be predetermined or dynamically determined) SHIFTpU (e.g. set to one shift per minute).

In some embodiments, the encoder reconfiguration operations may be deemed completed at this stage of the algorithm.

Oscillation Frequency Management Operations:

In some embodiments, in cases where the average number of downshifts and/or upshifts per viewing device exceeds the threshold SHIFTpU, the following oscillation frequency management operations may be performed:

In some embodiments, the current number of profiles CurrentVarNo in the set of profiles may be compared to the maximum number of profiles MaxVarNo in the set of profiles.

In some embodiments, if the current number of profiles CurrentVarNo in the set of profiles is smaller than the maximum number of profiles MaxVarNo in the set of profiles, the lowest bitrate profile from among those that have been deleted from the initial ABR ladder may be added back to the set of profiles by updating the manifest file accordingly, in some embodiments the current number of profiles CurrentVarNo may be updated (e.g. incremented), in some embodiments the UpdateManifest flag may be updated to TRUE. In other embodiments, if the current number of profiles CurrentVarNo in the set of profiles is smaller than the maximum number of profiles MaxVarNo in the set of profiles, the profile that may be added to the set of profiles by updating the manifest file may fulfill another criterion. For example, the profile to be added may be determined as a profile in between the two profiles exhibiting the greatest up/down shift numbers, which advantageously allows to hit the midpoint (in terms of either bitrate for Constant Bit Rate (CBR) or Quality for Certificate of Quality (CQ)) of the two profiles. This determined profile may or may not be comprised in the initial ABR ladder. In the case where the determined profile is not comprised in the initial ABR ladder, it may be generated, and in the case where the determined profile is comprised in the initial ABR ladder, it may be selected in the initial ABR ladder to be added back to the set of profiles.

Further to adding a profile in the set of profiles, in some embodiments the current number of profiles CurrentVarNo may be updated (e.g. incremented), and in some embodiments the UpdateManifest flag may be updated to TRUE.

In some embodiments the encoder reconfiguration operations described above may be performed in order to reconfigure the encoder to take into account the changes in the set of profiles reflected in the updated manifest file.

In some embodiments, the oscillation frequency management operations may be deemed completed at this stage of the algorithm.

In some embodiments, the profile management operations may be deemed completed at this stage of the algorithm, and in some embodiments the algorithm may loop back to perform another iteration for performing the above-described profile management operations. Depending on the embodiments, the iterations of this profile management loop may be performed continuously, or on a regular manner, for example periodically.

Figure 5:
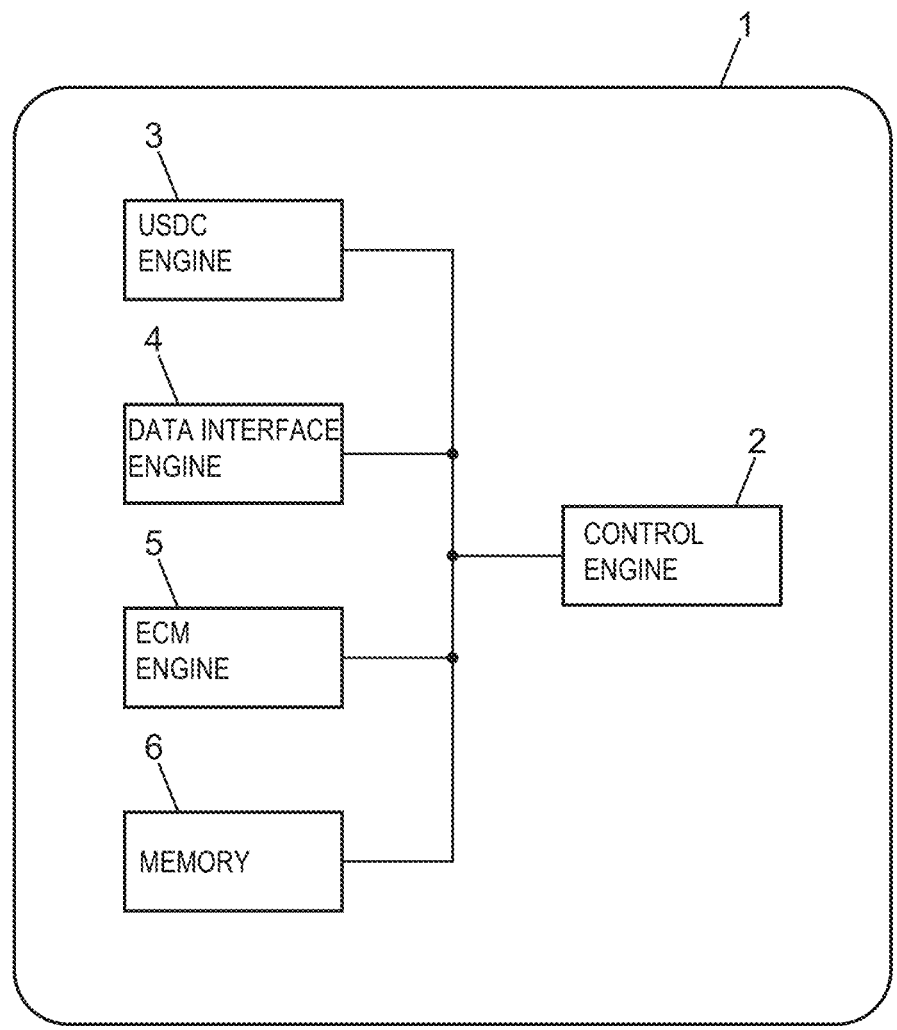
FIG. 5 illustrates an exemplary apparatus according to one or more embodiments of the present subject disclosure.

FIG. 5 illustrates an exemplary apparatus 1 configured to use a computational resource allocation feature in accordance with embodiments of the present subject disclosure. The apparatus 1 may, depending on the embodiment, be comprised in a processing node of a multimedia content distribution network, in a server platform which comprises one or more servers (which may be cloud-based), or in a resource management unit of a processing node of a multimedia content distribution network, or of a server platform.

The apparatus 1, which may comprise one or more computers, includes a control engine 2, usage statistics data collection (USDC) engine 3, a data interface engine 4, encoder configuration management (ECM) engine 5, and a memory 6.

In the architecture illustrated on FIG. 5, all of the usage statistics data collection (USDC) engine 3, data interface engine 4, encoder configuration management (ECM) engine 5, and memory 6 are operatively coupled with one another through the control engine 2.

In one or more embodiments, the usage statistics data collection (USDC) engine 3 may be configured to perform various aspects of embodiments of the proposed method for obtaining usage statistics data as described herein. In some embodiments, the usage statistics data collection (USDC) engine 3 may be implemented in software and incorporated in a computing machine running on a server and operating with an orchestration software (e.g. Kubernetes) according to embodiments of the present subject disclosure.

In some embodiments, the encoder configuration management (ECM) engine 5 is configured to perform various aspects of embodiments of one or more of the proposed methods as described herein, such as, updating a set of profiles based on usage statistics data provided by the usage statistics data collection (USDC) engine 3, determining an encoder configuration based on the updated set of profiles and reconfiguring the encoder used for encoding the multimedia content stream accordingly.

In some embodiments, the data interface engine 4 is configured to receive as input data encoder configuration data for encoding one or more multimedia content streams to be encoded by a computing platform configured with computation resources, for distribution in dynamic mode to viewing devices through a distribution network, such as for example comprising a CDN.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 6, capable of storing computer program instructions or software code that, when executed by the processor, causes the processor to perform the elements described herein. In addition, the memory 6 may be any type of data storage computer storage medium, capable of storing resource data, including resource allocation rules, resource allocation status, and resource status data (e.g. CPU status data) for use according to one or more embodiments of the present subject disclosure, coupled to the control engine 2 and operable with the data interface engine 4, encoder configuration management (ECM) engine 5, and the usage statistics data collection (USDC) engine 3 to facilitate management and processing of resource data stored in association therewith.

In embodiments of the present subject disclosure, the apparatus 1 is configured for performing the computational resource allocation methods described herein.

It will be appreciated that the apparatus 1 shown and described with reference to FIG. 5 is provided by way of example only. Numerous other architectures, operating environments, and configurations are possible. Other embodiments of the node may include fewer or greater number of components, and may incorporate some or all of the functionality described with respect to the apparatus components shown in FIG. 5. Accordingly, although the control engine 2, usage statistics data collection (USDC) engine 3, data interface engine 4, encoder configuration management (ECM) engine 5, and memory 6 are illustrated as part of the apparatus 1, no restrictions are placed on the location and control of components 2-6. In particular, in other embodiments, components 2-6 may be part of different entities or computing systems.

While the present subject disclosure has been described with respect to preferred embodiments, those skilled in the art will readily appreciate that various changes and/or modifications can be made to the present subject disclosure without departing from the spirit or scope of the present subject disclosure as defined by the appended claims.

Although this subject disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the present subject disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method for managing the encoding of a multimedia content stream distributed in dynamic mode to viewing devices through a distribution network according to a set of profiles comprising a plurality of multimedia data distribution profiles usable by the viewing devices for reception of the multimedia content stream, the method comprising, by a processing node of the distribution network:

obtaining usage statistics data for at least one of the multimedia data distribution profiles, wherein the usage statistics data represents usage, by the viewing devices, of the at least one multimedia data distribution profile for receiving the multimedia content stream;

based on the usage statistics data, updating the set of profiles to an updated set of profiles that excludes the at least one of the multimedia data distribution profiles from the set of profiles;

for an encoder which is used for encoding the multimedia content stream distributed to the viewing devices according to the set of profiles, determining, based on the updated set of profiles, an updated configuration of the encoder for encoding the multimedia content stream distributed to the viewing devices according to the updated set of profiles; and updating the configuration of the encoder for dynamically updating the encoding of the multimedia content stream by the encoder according to the determined updated configuration, wherein the set of profiles comprises, for each of the plurality of multimedia data distribution profiles, a profile status, and wherein the set of profiles is updated by switching the profile status of the at least one of the multimedia data distribution profiles from the set of profiles from active to inactive.

2. The method according to claim 1, wherein the plurality of multimedia data distribution profiles is a predefined set of multimedia data distribution profiles usable by the viewing devices for reception of multimedia content streams.

3. The method according to claim 1, wherein the set of profiles is updated by deleting the at least one of the multimedia data distribution profiles from the set of profiles.

4. The method according to claim 1, wherein each of the plurality of distribution profiles comprises a bitrate value, a quality setting value, a resolution value, a HDR/SDR encoding profile, a video codec profile, an audio codec profile, and/or one or more closed caption track profiles.

5. The method according to claim 1, wherein the usage statistics data comprises respective usage statistics data obtained for each of a plurality of the multimedia data distribution profiles.

6. The method according to claim 1, wherein the set of profiles is updated based on a comparison of the usage statistics data with a first threshold.

7. The method according to claim 1, wherein the usage statistics data for the at least one of the multimedia data distribution profiles comprises a percentage of viewing devices that are using the at least one of the multimedia data distribution profiles.

8. The method according to claim 1, wherein the usage statistics data is obtained by collecting statistics on usage of the at least one of the multimedia data distribution profiles for a first predetermined time period.

9. The method according to claim 1, further comprising: obtaining statistics data on a number of downshifts and upshifts per viewing device over a second predetermined period of time with respect to the updated set of profiles.

10. The method according to claim 9, further comprising: based on the statistics data on a number of downshifts and upshifts per viewing device, determining an average number of downshifts and upshifts per viewing device, and based on a comparison of the average number of downshifts and upshifts per viewing device with a second threshold, perform another update of the set of profiles by including in the set of profiles a multimedia data distribution profile that was previously excluded from the set of profiles.

11. The method according to claim 10, wherein the multimedia data distribution profile is selected among multimedia data distribution profiles that were previously excluded from the set of profiles based on a comparison of a bitrate value of the multimedia data distribution profile with respective bitrate values of the multimedia data distribution profiles that were previously excluded from the set of profiles.

12. The method according to claim 1, wherein the set of profiles is updated based on the usage statistics data by excluding at most a predetermined number of multimedia data distribution profiles from the set of profiles.

13. The method according to claim 12, wherein the multimedia data distribution profiles excluded from the set of profiles comprise a first and second multimedia data distribution profiles, the method further comprising: determining, based on the first and second multimedia data distribution profiles, an intermediate multimedia data distribution profile, and including in the set of profiles the intermediate multimedia data distribution profile.

14. An apparatus, the apparatus comprising a processor and a memory operatively coupled to the processor, wherein the apparatus is configured to perform a method for managing the encoding of a multimedia content stream distributed in dynamic mode to viewing devices through a distribution network according to a set of profiles comprising a plurality of multimedia data distribution profiles usable by the viewing devices for reception of the multimedia content stream, the method comprising, by a processing node of the distribution network:
  obtaining usage statistics data for at least one of the multimedia data distribution profiles, wherein the usage statistics data represents usage, by the viewing devices, of the at least one multimedia data distribution profile for receiving the multimedia content stream;
  based on the usage statistics data, updating the set of profiles to an updated set of profiles that excludes the at least one of the multimedia data distribution profiles from the set of profiles;
  for an encoder which is used for encoding the multimedia content stream distributed to the viewing devices according to the set of profiles, determining, based on the updated set of profiles, an updated configuration of the encoder for encoding the multimedia content stream distributed to the viewing devices according to the updated set of profiles; and
  updating the configuration of the encoder for dynamically updating the encoding of the multimedia content stream by the encoder according to the determined updated configuration,
  wherein the set of profiles comprises, for each of the plurality of multimedia data distribution profiles, a profile status, and wherein the set of profiles is updated by switching the profile status of the at least one of the multimedia data distribution profiles from the set of profiles from active to inactive.

15. The apparatus according to claim 14, wherein the plurality of multimedia data distribution profiles is a predefined set of multimedia data distribution profiles usable by the viewing devices for reception of multimedia content streams.

16. The apparatus according to claim 14, wherein the set of profiles is updated by deleting the at least one of the multimedia data distribution profiles from the set of profiles.

17. A non-transitory computer-readable medium encoded with executable instructions which, when executed, causes an apparatus comprising a processor operatively coupled with a memory, to perform a method for managing the encoding of a multimedia content stream distributed in dynamic mode to viewing devices through a distribution network according to a set of profiles comprising a plurality of multimedia data distribution profiles usable by the viewing devices for reception of the multimedia content stream, the method comprising, by a processing node of the distribution network:
  obtaining usage statistics data for at least one of the multimedia data distribution profiles, wherein the usage statistics data represents usage, by the viewing devices, of the at least one multimedia data distribution profile for receiving the multimedia content stream;
  based on the usage statistics data, updating the set of profiles to an updated set of profiles that excludes the at least one of the multimedia data distribution profiles from the set of profiles;
  for an encoder which is used for encoding the multimedia content stream distributed to the viewing devices according to the set of profiles, determining, based on the updated set of profiles, an updated configuration of the encoder for encoding the multimedia content stream distributed to the viewing devices according to the updated set of profiles; and updating the configuration of the encoder for dynamically updating the encoding of the multimedia content stream by the encoder according to the determined updated configuration, wherein the set of profiles comprises, for each of the plurality of multimedia data distribution profiles, a profile status, and wherein the set of profiles is updated by switching the profile status of the at least one of the multimedia data distribution profiles from the set of profiles from active to inactive.

18. The non-transitory computer-readable medium according to claim 17, wherein the plurality of multimedia data distribution profiles is a predefined set of multimedia data distribution profiles usable by the viewing devices for reception of multimedia content streams.

19. The non-transitory computer-readable medium according to claim 17, wherein the set of profiles is updated by deleting the at least one of the multimedia data distribution profiles from the set of profiles.

* * * * *